United States Patent [19]

Duke et al.

[11] 4,128,952
[45] Dec. 12, 1978

[54] MECHANICAL CHAIN ADJUSTER FOR SCRAPER ELEVATOR CHAINS

[75] Inventors: Edward D. Duke, Chicago; Joan M. Riordan, Glenview, both of Ill.

[73] Assignee: International Harvester Company, Chicago, Ill.

[21] Appl. No.: 850,880

[22] Filed: Nov. 14, 1977

[51] Int. Cl.² ............... B60P 1/36; B65G 23/44
[52] U.S. Cl. .................... 37/8; 198/813; 198/816; 74/242.1 R
[58] Field of Search ........... 37/8, 4; 198/709, 813, 198/816; 74/242.1 R, 242.1 A, 242.1 TA, 242.12, 242.8; 104/196

[56] References Cited

U.S. PATENT DOCUMENTS

| | | | |
|---|---|---|---|
| 1,491,716 | 4/1924 | McKelvy | 74/242.1 R |
| 2,953,241 | 9/1960 | Lehman | 198/816 |
| 2,970,587 | 2/1961 | Estes | 74/242.1 R X |
| 2,985,027 | 5/1961 | Murray | 74/242.1 R |
| 3,161,280 | 12/1964 | Creighton et al. | 37/8 X |
| 3,444,750 | 5/1969 | Stuller | 37/8 X |
| 3,665,780 | 5/1972 | Lunenschloss | 74/242.1 R |
| 3,826,149 | 7/1974 | Freese | 74/242.1 A X |
| 3,930,323 | 1/1976 | Marold | 37/8 |
| 3,934,362 | 1/1976 | Hyler | 37/8 |

FOREIGN PATENT DOCUMENTS

| | | | |
|---|---|---|---|
| 439385 | 2/1926 | Fed. Rep. of Germany | 198/709 |
| 677095 | 3/1930 | France | 198/709 |
| 8432 of | 1905 | United Kingdom | 744/242.1 A |
| 461870 | 7/1975 | U.S.S.R. | 198/813 |

*Primary Examiner*—E.H. Eickholt
*Attorney, Agent, or Firm*—Douglas W. Rudy; Ronald C. Kamp; F. David AuBuchon

[57] ABSTRACT

A chain tension maintenance device for use with the bowl loading elevator of the excavating scraper variety which is adjustable to vary the slack in the chain and paddle structure. At least one idler arm having bell crank geometry is pivotally mounted to the elevator frame through a first pivot point. An idler wheel axially mounted at a second pivot point of the idler arm, is urged into tension maintaining contact with the elevator chains by force exerted through the third pivot point of the idler arm by an adjustable turnbuckle grounded to the elevator frame.

21 Claims, 4 Drawing Figures

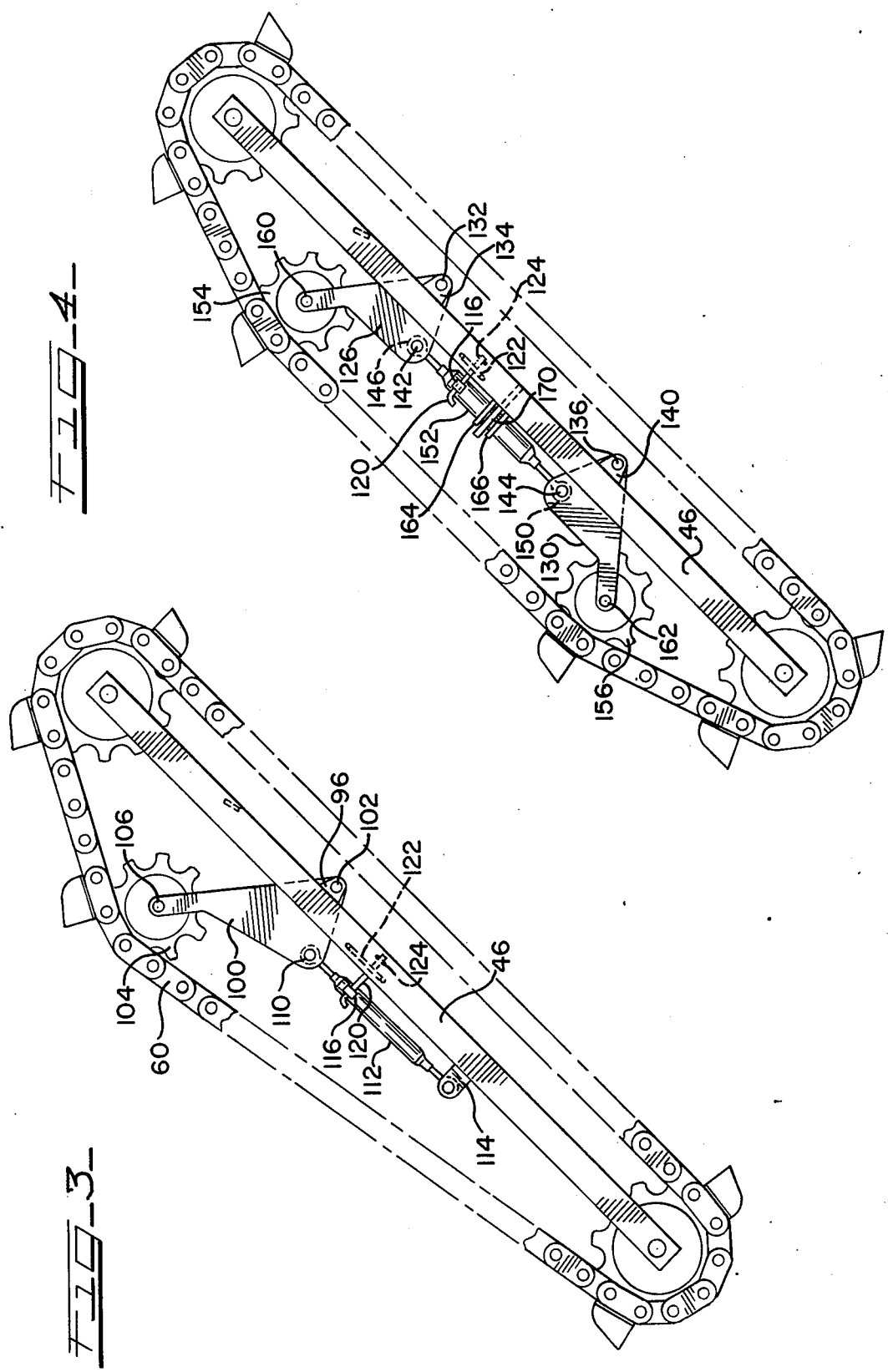

MECHANICAL CHAIN ADJUSTER FOR SCRAPER ELEVATOR CHAINS

BACKGROUND OF THE INVENTION

1. Field of the Invention

A chain tension maintenance means is provided to maintain the tension of the paddle and chain structure of an elevator as used on an elevating scraper.

2. Description of the Prior Art

An optional device on earth moving scrapers is an elevator that assists in loading the bowl or load carrying portion of an earth moving scraper. The elevator is usually comprised of a pair of substantial chains driven by sprocketed axles. A series of paddles are carried by the chain pair transversely thereto to make a unified structure for loading the scraper.

Elevator chains of elevating scrapers tend to stretch and wear under normal operation. Currently only complicated and time consuming adjustment means are available. Typical adjustment procedure would require the use of hydraulic cylinders intergral with the elevator frame to maintain tension. Alternative procedures may require hydraulic jacks to tension the chain while idler sprocket bolted connections are repositioned. As the chains on each side of the elevator may wear or stretch at different rates it is occasionally necessary to remove or add links to allow the range of a tensioning idler to accommodate the chain. Most contempory procedures can be improved upon through cost reduction, decreased complexity or ease of adjustment.

SUMMARY OF THE INVENTION

A chain tensioner is provided for use in tensioning the chains of the elevator train of an elevating scraper. A pivotally mounted idler arm having bell crank geometry is carried on each side of the elevator frame. An idler wheel is axially mounted to one pivotal location of the idler arm such that it may be in its sprocketed relationship with each elevator chain. A turnbuckle is pivotally mounted or grounded to the elevator frame at one end thereof and pivotally mounted to a third pivotal location on the idler arm. Turnbuckle adjustment decreasing the length of the turnbuckle results in an increased angular relationship between the elevator frame and the idler wheel effectively moving the idler wheel away from the elevator frame and thus increasing the chain tension. An adjusting lug is provided on the turnbuckle and further accommodates an adjusting pin which serves as a turnbuckle lock when proper tensioning exists in the chain and as an adjusting tool to operate the turnbuckle to increase or decrease chain tension.

Alternative structures using the same principles of operation are also disclosed. A first of these structures embodies a single turnbuckle and an elongated single idler arm having a pair of idler wheels one located at each end of the elongated idler arm. One idler wheel maintains tension on the chain through its position on chain contact relatively above the elevator frame while the other idler wheel maintains tension on the chain relatively below the elevator frame.

A third embodiment incorporates a fixed center point turnbuckle positioned between a pair of idler arms of identical geometry which will position attendant idler wheels against the elevator chain on the same relative sides of the elevator frame. Turnbuckle adjustment in this configuration results in simultaneous and equal adjustment of each idler arm upon adjustment of the fixed center turnbuckle.

The primary object of this invention is to provide a simplified, efficient, low cost means of adjustment. This is accomplished through the use of the turnbuckle as provided with the adjusting pin carried on the turnbuckle. No extraneous adjustment tools are needed.

It is further an object to provide a chain adjusting device allowing infinite adjustment increments for each of the pair of chains in an elevator.

Another object of this invention is to provide an adjusting device that will maintain a preset adjustment when subject to continuous vibration or jostling.

BRIEF DESCRIPTION OF THE DRAWINGS

The environment of the instant invention as well as several embodiments thereof are presented by the drawing figures in which:

FIG. 3 is a side view of an elevator chain tensioner having a single tension arm and sprocket; and FIG. 4 is a side view of an elevator chain tensioner having a pair of tension arms and sprockets.

DETAILED DESCRIPTION OF THE INVENTION

Figure 1:
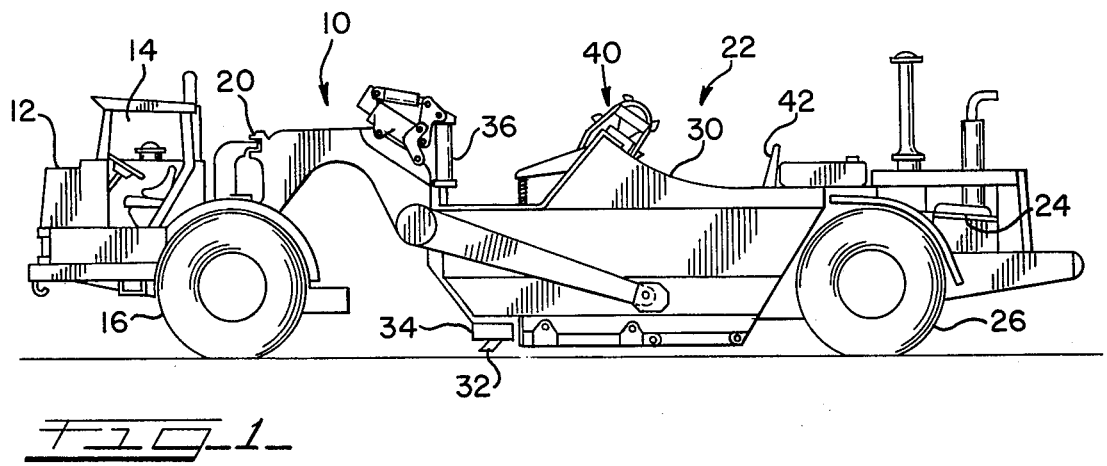
FIG. 1 presents an elevation view of a construction scraper that would accommodate the invention.

The invention is fully shown in the accompanying drawings wherein FIG. 1 presents the environment typical for the application of an elevator chain tensioner. In FIG. 1 an elevating scraper generally 10 includes a forward drive section 12 accommodating an operator's compartment 14 and supported on driven axle and wheel assembly 16. The forward drive section is a conventional apparatus of a scraper and generally includes an engine and drive train (not specifically shown). Pivotally attached at articulation point 20 to the forward drive section is a trailing rear section generally 22. In the scraper shown this rear section 22 is equipped with a rear drive engine 24 and drive train to drive the rear wheel and axle assembly 26, however, it is also common to manufacture elevating scrapers without rear engines.

The conventional functional parts of the scraper include the bowl 30, the cutting edge 32, the side cutter blades 34, the bowl cylinders, one shown as 36, the elevator generally 40 which is the specific apparatus of importance to this invention, and an ejector 42 which may slide forward in the bowl 30 to assist in unloading the bowl.

In operation the scraper is driven over a path to be excavated with the cutting edge 32 lowered below the ground surface. As the excavated material builds up on the apron or floor of the bowl 30 the elevator 40 will be driven in a counterclockwise direction to load material into the bowl. When the bowl is full the operator elevates the cutting edge 32 and the bowl 30 to prevent further loading. This process is conventional.

The remaining figures show three embodiments of elevators equipped with variations of this invention. In each of these figures like numbers represent like parts and distinctively different components are assigned unique reference numbers.

Figure 2:
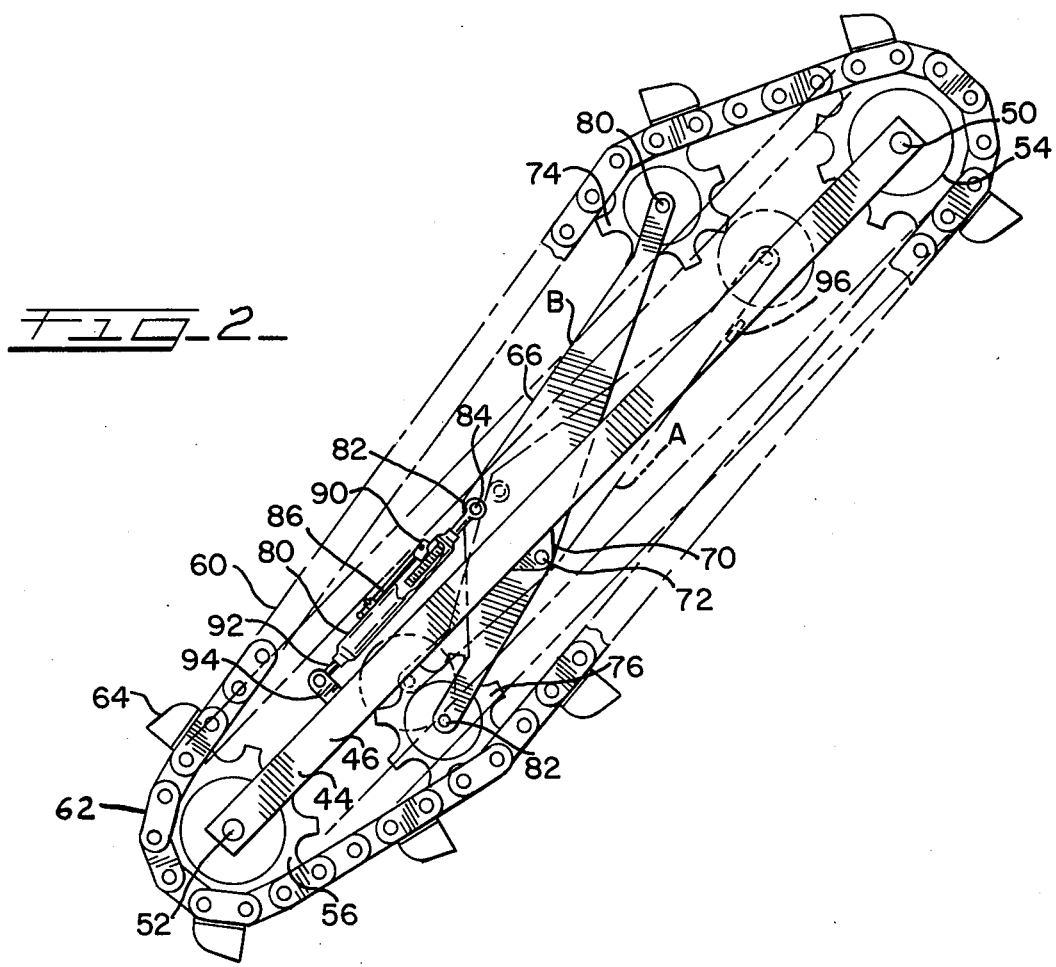
FIG. 2 is a side view of an elevator chain tensioner having a single tensioning arm with a pair of chain sprockets.

In FIG. 2 an elevator is shown separated from the scraper vehicle. The elevator is built around an elevator frame 44 which is a rectangular frame having a pair of longitudinal side frame members one shown as 46, and a plurality of transverse cross members which are not shown. A driven axle 50 or a driven cross support tube and a lower shaft or undriven axle 52 are carried at the ends and between the side frame members 46 transversely thereto. Each axle includes a pair of sprockets, specifically shown are a driven sprocket 54 and a lower sprocket 56. The lower sprocket could alternatively be a untoothed chain guide.

An endless elevator chain 60 composed of links 62 is simultaneously engaged by the driven 54 and lower 56 sprockets. A typical elevator will have a pair of endless chains between each set of driven and lower sprockets. A plurality of paddles such as 64 are provided transversely between the paired endless chains thus combining each of the two endless chains into a unitary device.

The chain tensioner of the FIG. 2 embodiment includes a double idler arm 66 which is pivotally mounted to a bracket 70 through pivot pin 72. The double idler arm is based on a quadralateral plate with a plurality of apertures for use as pivot points for supporting related axles. Each double idler arm 66 carries a pair of idler wheels, an upper 74 and a lower 76 pivotally mounted on axles 80 and 82 respectively. The idler wheels of all the embodiments present herein may have sprocket teeth if desirable or may be untoothed. The idler wheels are located by the placement of the double idler arm to engage the endless chain 60. The idler wheels are located in the same plane as the driven and undriven sprockets in order to assure good alignment with the chains. Turnbuckle 80 is pivotally attached at a first end 82 thereof to a pivot point 84 turnbuckle attachment means on the double idler arm 66. A second end 92 of the turnbuckle is pivotally mounted to a turnbuckle anchor or support 94 which is integral with the side frame members 44. The turnbuckle is relatively conventional with an elongated central body having a threaded longitudinal bore with right and left hand threads. Threaded eyebolts are accommodated by the central body in a conventional manner. A handle 86 is provided on the elongated central body of the turnbuckle to serve the dual purpose of acting as a adjusting wrench and preventing undesirable adjustment of the turnbuckle through vibration. A locking mechanism 90 is provided on the body of the turnbuckle.

As shown in FIG. 2 the chain adjuster is movable from a dotted line position A, which represents a virtually non-tension inducing displacement, to the solid line position B which represents a substantially adjusted position. When in position A stop 96 prevents further clockwise rotational adjustment of the double idler arm.

Adjustment, typically to increase chain tension, is facilitated by removing the handle 86 from its retaining means on the turnbuckle and using it as a wrench to turn the turnbuckle. As is apparent the decrease in the overall length of the turnbuckle facilitated by the threaded parts thereof being fed into the turnbuckle pivots the double idler arm 66 around point 72 thus urging each double idler arm outwardly against the chain as shown by the solid line displacement B of FIG. 2. Similar adjustment will be made to the idler arm assembly on the other side of the elevator in order to insure that both chains are equally tensioned. After adjustments the handle 86 is replaced in its retaining means on the turnbuckle so it will be available for future adjustments.

FIG. 3 presents an alternative embodiment of the elevator chain tensioner. Basic elements of the frame are as described in FIG. 2 with the differences being in the tensioning apparatus itself.

A bracket 96 is attached to the side frame members 46 to which idler arm 100 is pivotally attached by pivot pin 102. The idler arm is of a generally triangular shape having an aperture at each corner thereof to affect a bell crank type geometry when connected to the frame, turnbuckle and idler wheel. This geometry is dependent on the placement of the apertures. As can be seen in FIG. 3 the distance between the first and second apertures is less than the distance between the second and third apertures. The idler arm 100 carries idler wheel 104 on axle 106 which is engageable with the endless chain 60 as shown.

The idler arm 100 is maintained in a tensioning position against the endless chain 60 by the bell crank geometry presented by the location of the pivotal means 110 which allows a turnbuckle 112 similar to that earlier to be attached thereto and to hold the idler arm 100 in position.

The second end of the turnbuckle is pivotally mounted to the support 114. The turnbuckle is provided with at least one adjusting lug 116 which is equipped with an aperture therethrough to accommodate a pin 120 that also passes into a pin chuck 122 having an elongated slot that can receive the pin 120 regardless of the elongation of the turnbuckle. The pin 120 is a rod having a bent end portion perpendicular to the major axis of the rod. A retaining means 124 may also be provided to prevent pin 120 from being jostled out of the pin chuck 122. The retaining means may be associated with an aperture in the end of the pin. The pin 120 may be removed from the pin chuck 122 and used as a lever or tool to adjust the turnbuckle as this becomes necessary.

Adjustment to increase chain tension entails removing the pin 120 from its retained position and utilizing it as a tool to turn the turnbuckle. The pin 120 would be engaged with the adjusting lug 116 to provide necessary leverage to turn the turnbuckle. Adjustment decreasing the overall length of the turnbuckle results in increased tension on the chain. Adjustment of both tensioners (one on each side of the elevator frame may be desirable in order to maintain even tension throughout the elevator.) Obviously lengthening the turnbuckle results in decreased chain tension.

A third embodiment is shown by FIG. 4 which uses the principles taught by this disclosure through the use of a pair of idler arms. The pair of idler arms are shown as first twin idler arm 126 and second twin idler arm 130. The first twin idler arm is pivotally mounted at first pivot point 132 to a first apertured tab 134 which is integral with the side frame member 46. The second twin idler arm 130 is pivotally mounted at second pivot point 136 to a second apertured tab 140 also integral with the side frame member 46. Each twin idler arm is equipped with a pivot point 142 and 144 respectively, to accommodate the attaching ends 146 and 150 of the twin turnbuckle 152. Each twin idler arm carries a twin idler wheel 154 and 156 on axles 160 and 162 respectively as is apparent from the drawing figure. The relative triangular shape of these idler arms is apparent from FIG. 4.

The twin turnbuckle 152 used in this embodiment is similar to the turnbuckle 112 of FIG. 3, and has features of the turnbuckles previously described, with the addition of first 164 and second 166 washers welded to the body of the twin turnbuckle to provide locating flanges.

A turnbuckle guide 170 having an aperture to accommodate the twin turnbuckle is welded or otherwise affixed to each side frame member 46 through which the twin turnbuckle passes. The washers or locating flanges 164 and 166 prevent significant lateral movement of the twin turnbuckle as they will not pass through the aperture of the guide 170.

The pin 120, adjusting lug 116, pin chuck 122 and retaining means 124 are similar to items shown in FIG. 3.

Adjustment of this chain tensioning device is exactly as described for the adjustment of the FIG. 3 embodiment as is apparent.

Thus it is apparent that there has been provided, in accordance with the invention, a chain tensioner that fully satisfies the objects set forth above. While the invention has been described in conjunction with three specific embodiments, it is evident that many alternatives, modifications and variations will be apparent to those skilled in the art. Accordingly, this disclosure is intended to embrace all such alternatives, modifications and variations as fall within the scope of the appended claims.

What is claimed is:

1. An elevating scraper vehicle having an elevator including an elevator frame, a driven cross support tube having a sprocket at each end thereof carried on a first end of said elevator frame, a lower shaft having a chain guide at each end thereof mounted to a second end of said elevator frame, a pair of endless elevator chains carried around said sprocket and said chain guide of said cross support tube and said lower shaft respectively and a plurality of paddles transversely mounted to each elevator chain, and a pair of chain tensioners each chain tensioner comprising:
    a turnbuckle anchor, fixedly mounted to said elevator frame;
    a turnbuckle having a first end attached to said turnbuckle anchor;
    a bracket fixedly mounted to said elevator frame between said turnbuckle anchor and said driven cross support tube;
    an idler arm pivotally mounted to said bracket on said elevator frame, said idler arm attached to a second end of said turnbuckle;
    an idler wheel mounted for rotational movement to said idler arm in the same plane as said endless chain between said frame and said chain whereby adjustment of said turnbuckle resulting in a decreased length thereof urges said idler wheel against said chain urging said chain away from said elevator frame increasing the chain tension.

2. The invention in accordance with claim 1 wherein said turnbuckle comprises:
    an elongated central body portion having a longitudinal bore threaded from a first end thereof with a right hand thread and from a second end thereof with the left hand thread;
    a pair of eye bolts threaded into respective first and second ends of said longitudinal bore of said central body;
    an adjusting lug formed on said central body of said turnbuckle provided with a through aperture.

3. The invention in accordance with claim 2 wherein said adjusting lug accommodates a turnbuckle adjusting pin, said turnbuckle adjusting pin comprising a rod having an end portion being a bent portion of said rod perpendicular to the major axis of the rod and the rod further provided with an aperture at the lower end thereof for accommodating a retention means.

4. The invention in accordance with claim 1 wherein said idler arm further comprises:
    a plate of generally triangular shape having a plurality of apertures therethrough for use as pivot points, the apertures arranged one to each corner on the triangular plate;
    a turnbuckle attachment means provided to pivotally connect said turnbuckle to a first aperture of said plate;
    idler arm attachment means passing through a second aperture of said plate provided to pivotally connect said idler arm to said elevator frame idler arm support;
    an idler wheel axle providing rotational attachment of said idler wheel to a third aperture of said plate whereby a bell crank geometry is provided by the location of said apertures of said plate between said turnbuckle and said idler wheel.

5. The invention in accordance with claim 4 wherein the distance between the first and second apertures in said plate is substantially less than the distance between said second and third apertures of said plate.

6. The invention in accordance with claim 1 wherein said idler wheel is provided with a toothed sprocket compatible with the links of said chain.

7. The invention in accordance with claim 1 wherein said elevator frame is provided with a stop fixedly mounted to the frame in a position inboard of the extreme travel limit of the radial displacement of said idler arm whereby excessive travel of the idler wheel past the elevator frame may be prevented.

8. The invention in accordance with claim 1 wherein a pin chuck having a through aperture is fixedly attached to said elevator frame.

9. An elevating scraper vehicle having an elevator including an elevator frame, a driven cross support tube having a sprocket at each end thereof carried on a first end of said elevator frame, a lower shaft having a chain guide at each end thereof mounted to a second end of said elevator frame, a pair of endless elevator chains carried around said sprocket and said chain guide of said cross support tube and lower shaft respectively, a plurality of paddles transversely mounted to each elevator chain, and a pair of chain tensioners, each chain tensioner comprising:
    a first and a second apertured tab spaced apart from each other and fixedly mounted to said elevator frame;
    a turnbuckle guide having a large central aperture fixedly mounted to said elevator frame midway between said pair of tabs;
    a turnbuckle passing through said aperture of said turnbuckle guide, the turnbuckle having an elongated central body portion equipped with a pair of external turnbuckle travel limiting flanges preventing lateral movement of the turnbuckle through said apertured turnbuckle guide;
    a pair of idler arms each pivotally mounted to one of said first and second on said elevator frame, said idler arms further being pivotally attached to said turnbuckle;
    a pair of idler wheels, one mounted for rotational movement to each of said idler arms in the same plane as said endless chain between said frame and said chain whereby adjustment of said turnbuckle resulting in a decreased length thereof urges said pair of idler wheels against said chain urging said chain away from said elevator frame increasing the chain tension.

10. The invention in accordance with claim 9 wherein said turnbuckle comprises:
    an elongated central body portion having a longitudinal bore threaded from a first end thereof with a right hand thread and from a second end thereof with a left hand thread;
    a pair of eye bolts threaded into respective first and second ends of said longitudinal bore of said central body;
    an adjusting lug formed on said central body of said turnbuckle provided with a through aperture.

11. The invention in accordance with claim 10 wherein said adjusting lug accommodates a turnbuckle adjusting pin, said turnbuckle adjusting pin comprising a rod having an upper portion bent at a right angle to a major axis of said pin, the rod further provided with an aperture at the lower end thereof, and the retention means positioned in said lower end aperture.

12. The invention in accordance with claim 9 wherein each of said idler arms further comprises:
    a plate of generally triangular shape having a plurality of apertures therethrough for use as pivot points, the apertures arranged one to each corner of the triangular plate;
    turnbuckle attachment means provided to pivotally connect said turnbuckle to a first aperture of said plate;
    idler arm attachment means passing through a second aperture of said plate provided to pivotally connect said idler arm to said elevator frame idler arm bracket;
    an idler wheel axle providing rotational attachment of said idler wheel to a third aperture of said plate, whereby a bell crank geometry is provided through the location of said apertures of said plate between said turnbuckle and said idler wheel.

13. The invention in accordance with claim 9 wherein said idler wheel is provided with a toothed sprocket compatible with the links said chain.

14. The invention in accordance with claim 9 wherein said elevator frame is provided with a plurality of stops each fixedly mounted to the frame preventing movement of each idler arm past the elevator frame.

15. The invention in accordance with claim 9 wherein a pin chuck having a through aperture is fixedly attached to said elevator frame.

16. In an elevating scraper vehicle having an elevator including an elevator frame, a driven cross support tube having a sprocket at each end thereof carried on a first end of said elevator frame, a lower shaft having a chain guide at each end thereof mounted to a second end of said elevator frame, a pair of continuous elevator chains carried around said sprocket and said chain guide of said cross support tube and said lower shaft respectively, a plurality of paddles transversely mounted to each elevator chain, and a pair of chain tensioners, each chain tensioner comprising:
    a turnbuckle support fixedly mounted to said elevator frame;
    a turnbuckle having a first end attached to said turnbuckle support;
    a bracket fixedly mounted to said elevator frame between said support and said driven cross support tube;
    an idler arm pivotally mounted to said bracket on said elevator frame, said idler arm attached to a second end of said turnbuckle;
    a pair of idler wheels mounted for rotational movement on said idler arm in the same plane as said endless chain between said frame and said chain whereby adjustment of said turnbuckle resulting in a descreased length thereof urges said idler wheels against said chain, one idler wheel affecting chain tension on one side of the frame and the second idler wheel affecting chain tension on the other side of the frame.

17. The invention in accordance with claim 16 wherein said turnbuckle comprises:
    an elongated central body portion having a longitudinal bore threaded from a first end thereof with a right hand thread and from a second end thereof with a left hand thread;
    a pair of eye bolts threaded into respective first and second ends of said longitudinal bore of said central body;
    an adjusting lug formed on said central body of said turnbuckle provided with a through aperture.

18. The invention in accordance with claim 16 wherein said idler arm further comprises:
    an elongated quadralateral plate having a plurality of apertures therethrough for use as pivot points, the apertures arranged one to each corner of the quadralateral plate;
    turnbuckle attachment means provided to pivotally connect said turnbuckle to a first aperture of said plate;
    idler arm attachment means passing through a second aperture of said plate is provided to pivotally connect said idler arm to said elevator frame idler arm bracket;
    a pair of idler wheel axles providing a rotational attachment point for attaching said idler wheels through third and fourth apertures of said idler arm quadralateral plate whereby compound bell crank geometry is provided by the location of said apertures of said plate between said turnbuckle and said idler wheels.

19. The invention in accordance with claim 16 wherein said idler wheels are provided with a toothed sprocket compatible with the links of said chain.

20. The invention in accordance with claim 16 wherein said elevator frame is provided with a stop fixedly mounted to the frame whereby excessive travel of said idler arm past the frame is prevented.

21. In an elevator of an elevating scraper having an elevator frame, a pair of driven sprockets and a pair of non-driven sprockets, a pair of elevator chains carried by respective driven and non-driven sprockets the chains connected together by a plurality of transverse paddles and a pair of chain tensioners comprising:
    a support fixedly mounted to said elevator frame between said driven sprocket and said non-driven sprocket;
    a turnbuckle having a first and a second end pivotally mounted to said support and said first end;
    an idler arm having a plurality of apertures the first aperture to which said second end of said turnbuckle is pivotally mounted;
    a bracket fixedly mounted to said elevator frame between said support and said non-driven sprocket to which said idler arm is pivotally mounted through a second of said apertures in said idler arm;
    an idler wheel supported for rotational movement in the third of said apertures of said idler arm said idler wheel in engaged relationship with said elevator chain whereby adjustment of said turnbuckle will result in an desired amount of chain tension and said idler wheel urges said chain outwardly from said elevator frame.

* * * * *